Figure 1:
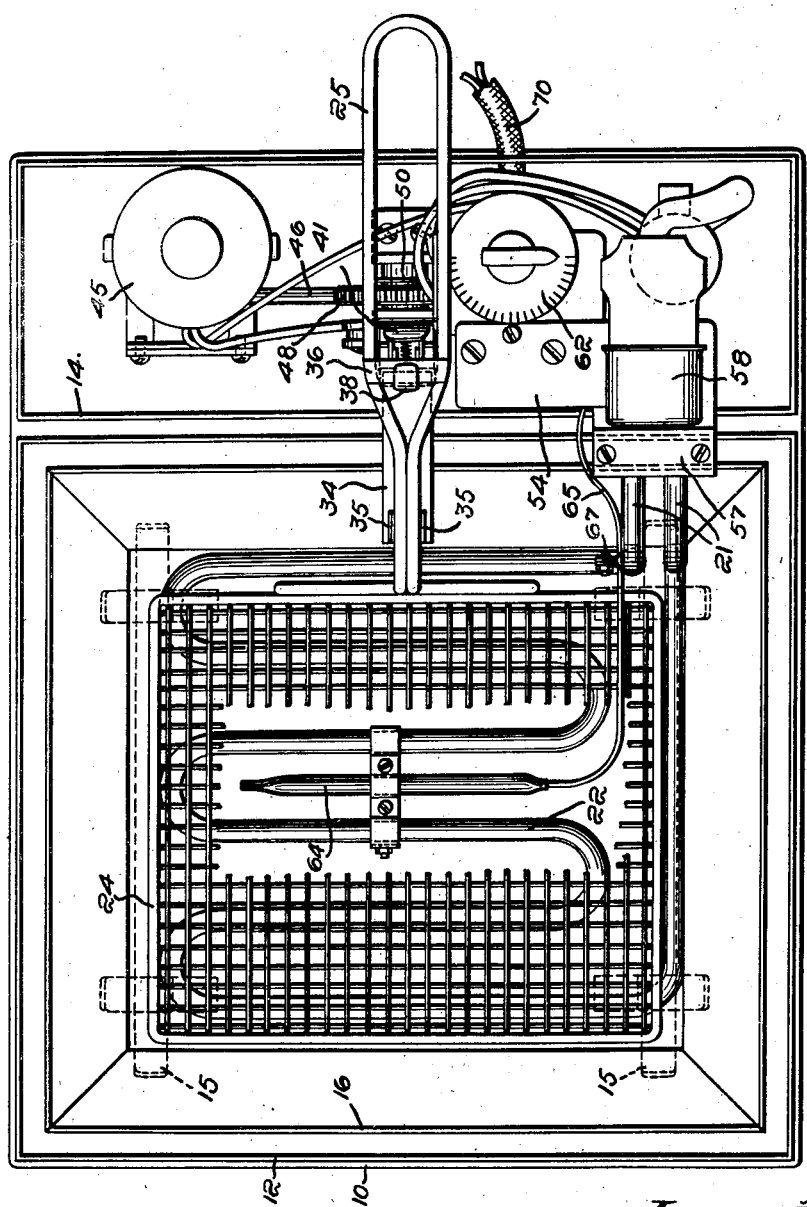

Sept. 24, 1940.    H. M. HUSK    2,215,929
COOKING MACHINE
Filed Oct. 12, 1939    3 Sheets-Sheet 1

Inventor:
Harry M. Husk,
by Kenway & Witter
Attorneys

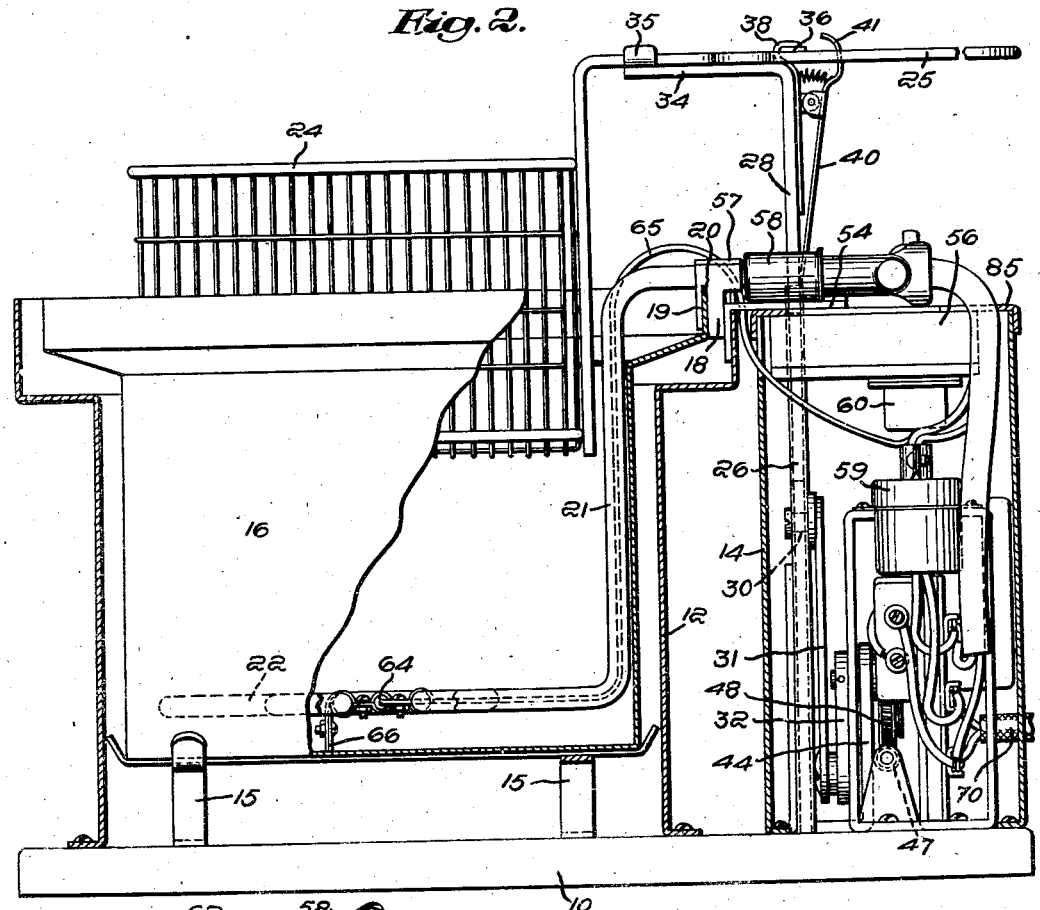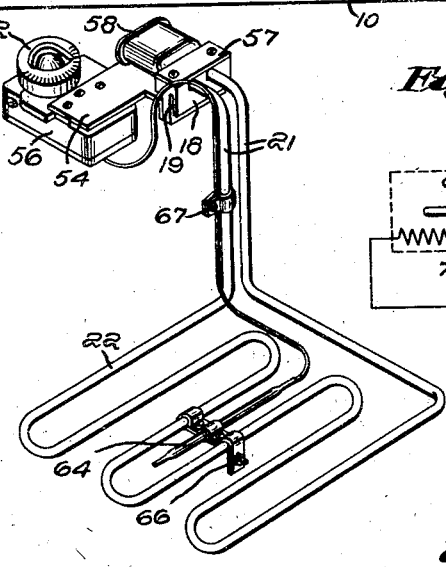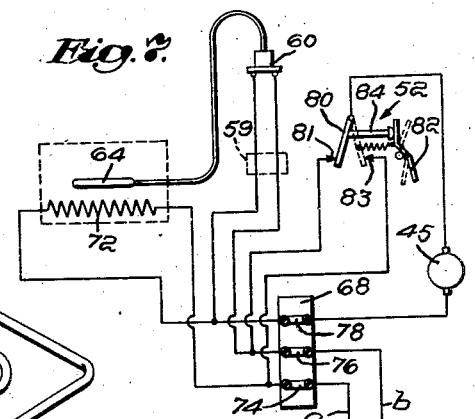

Sept. 24, 1940.  H. M. HUSK  2,215,929
COOKING MACHINE
Filed Oct. 12, 1939  3 Sheets-Sheet 3
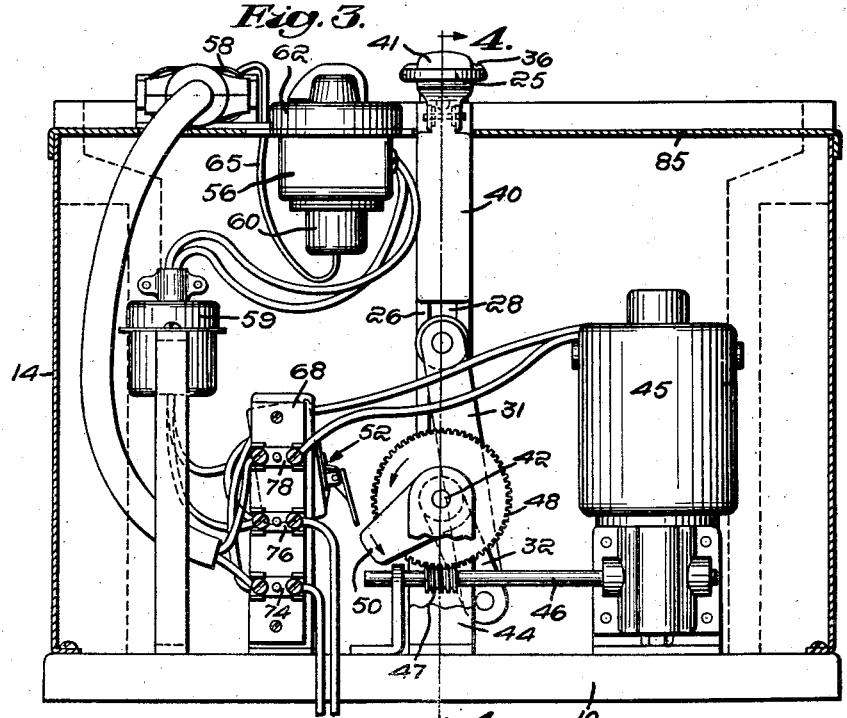
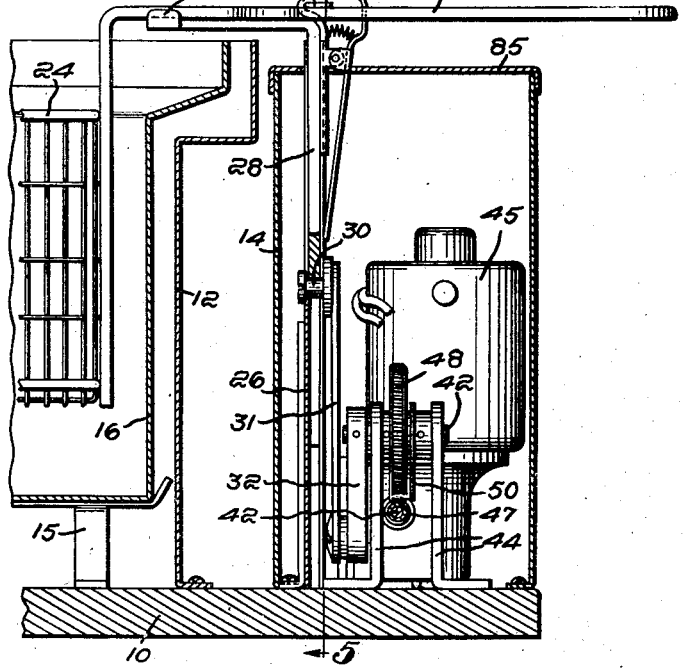
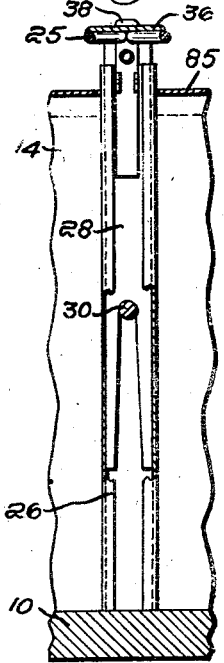
Inventor:
Harry M. Husk,
by Kenway & Witter
Attorneys Patented Sept. 24, 1940

2,215,929

UNITED STATES PATENT OFFICE 2,215,929

COOKING MACHINE

Harry M. Husk, Newburyport, Mass., assignor to Electricooker, Inc., Newburyport, Mass., a corporation of Massachusetts Application October 12, 1939, Serial No. 299,128

7 Claims. (Cl. 53—7)

This invention relates to machines for cooking or frying various materials, usually of an edible nature, such as nut meats, potato chips, etc., in oil or similar cooking liquid, the invention more particularly concerning cooking machines which are semi-automatic to the extent that the product to be cooked or treated is supplied to and removed from the machine manually but wherein the operation of the machine is substantially otherwise automatic.

In Reissue Patent No. 20,570 is disclosed a fully automatic cooking machine more particularly adapted for the cooking of nut meats, this machine employing a hopper and mechanism for automatically removing the cooked product from the cooking medium and delivering measured quantities of the uncooked product from the hopper to the cooking medium following the removal of the cooked product, the machine operating automatically and continuously. In my co-pending application Ser. No. 195,121, filed March 10, 1938, I have disclosed a relatively simple and less expensive semi-automatic cooking machine which is constructed to operate and cook in a manner similar to the said fully automatic machine, and the primary object of my present invention herein disclosed is the production of an improved semi-automatic cooking machine of this nature.

My invention is concerned more particularly with a home or restaurant cooker into which may be placed and cooked various edibles and which will automatically remove the edibles from the cooking medium when the cooking is completed. The machine includes a container for the cooking liquid, a foraminous basket or other suitable holder for the product to be cooked and an electric heating unit for the cooking liquid, these elements preferably being relatively detachable whereby they can be conveniently washed and cleansed independently, all of which features are broadly disclosed in my said co-pending application. My improved construction disclosed herein is relatively simpler, more compact, more convenient, and more economical to manufacture, these improvements comprising novel features of construction and re-arrangement of parts all of which contribute to the superior product hereinafter more specifically described.

These and other features of the invention will become more apparent from the following described embodiment of the same illustrated in the accompanying drawings and wherein, Fig. 1 is a plan view of my improved cooking machine, Fig. 2 is a front elevation thereof with portions broken away, Fig. 3 is an end elevation with the housing broken away, Fig. 4 is a sectional view taken on line 4—4 of Fig. 3, Fig. 5 is a fragmentary view taken on line 5—5 of Fig. 4, Fig. 6 is a perspective view of the heating unit, and Fig. 7 is a diagrammatic view showing the electrical connections.

Referring now more specifically to the drawings, 10 indicates a base on which are mounted two housings 12 and 14 in relatively spaced relation. Supported on front and rear brackets 15 on the base is a tank or container 16 for the cooking liquid. In Fig. 6 is illustrated an electrical heating unit, hereinafter more specifically described, and this unit includes a supporting block 18 slotted at 19 to receive the top edge portion 20 of the tank. When the slot is engaged over such edge portion 20 the downwardly extending legs 21 of the heater extend into the tank along a side wall thereof and the horizontal bottom portion 22 is spaced from but located adjacent to the bottom of the tank. A foraminous basket 24 of a size and configuration corresponding to the inside of the tank is adapted to be received vertically into and moved vertically out of the tank, the basket being provided with a supporting and carrying handle 25 extending laterally thereof and horizontally beyond the basket and container whereby it can be freely grasped and the basket conveniently carried from the machine without exposing the hands to the heat of the basket or container.

Supported on the base 10 within the housing 14 is a vertically extending U-shaped guideway 26 and slidable within the guideway through its open top and is a bar 28 bifurcated at its lower end to receive the stud 30 on the top end of a link 31, the bottom end of the link being connected to a rotary crank 32. The top end of the bar is bent horizontally toward the container 16 to provide a support 34 for receiving the basket handle 25, the front portion of the handle being received between two lugs 35 on the support. A bridge piece 36 rearwardly thereof on the handle is adapted to be received beneath a rearwardly extending finger 38 on the support. When thus engaged, as illustrated in Figs. 2 and 4, the basket is held securely on the support.

When the basket is in its lowermost and cooking position in the container, the weight of the basket and its support 34 is carried by the stud 30. Rotation of the crank 32 is adapted to raise the support and lift the basket from the cooking liquid. At the uppermost end of this lift a spring pressed latch 40 carried by the bar 28 engages the top end of the guideway 26 and retains the support and basket in raised position independently of the crank, as illustrated in Fig. 2. A thumb receiving and releasing portion 41 of the latch is located conveniently to the handle 25 whereby the latch can be manually released when the basket is to be lowered into the container.

The crank 32 is carried on a shaft 42 supported in two uprights 44 and is driven from an electric motor 45 through reduction gearing including a shaft 46 having a worm 47 thereon in mesh with a worm gear 48 on the shaft 42. A cam 50 also carried on the shaft 42 is adapted to operate on a switch 52 in the electric circuit as and for a purpose hereinafter described.

The heating unit illustrated in Fig. 6 embodies a supporting plate 54 having mounted thereon the block 18 and a heat controlling switch box 56. The heater 21—22 is secured to the block 18 by a clamping plate 57 and a socket connection 58 is carried on the outer ends of the heater. The cooking principle employed in this machine is the same as disclosed in the said Reissue Patent 20,570 and in my said co-pending application; namely, the cooking is continued until the cooking liquid reaches a predetermined temperature. Mounted within the box 56 is a normally closed snap switch 60 under the control of a manually operated dial 62 and an automatically operating thermostat 64. The thermostat is of the expansible fluid type and has communication with the switch through a tube 65, the thermostat and tube being mounted on the heating unit by clamps 66 and 67. The clamp 66 has a downwardly extending portion for spacing the heater from the bottom of the container and cooperating with the slot 19 to properly support the heater. The switch is normally in the closed position indicated in Fig. 7 and is automatically snapped to the open position when the liquid surrounding the thermostat reaches the predetermined temperature. This predetermined temperature may be varied by rotating the dial 62 which is suitably graduated as illustrated in Fig. 1. The mechanism within the box 56 is standard equipment and need not be specifically described.

The wiring circuit, through which automatic control of the cooking is effected, is illustrated in Fig. 7 and includes a contact block 68 within the housing 14 and carrying the switch 52. The switch 60 may be termed the main switch since it controls the operation of the heating unit and the motor, and the switch 52 is termed the auxiliary switch. The parts are shown in their normal positions in Fig. 7, that is, the position they occupy when the machine is idle and not in use.

The operation of the machine may be briefly described as follows: The cooking liquid is first placed in the container 16 and the dial 62 is set to the proper predetermined temperature for the particular material to be cooked. The main cord 70 is then plugged into the electric socket. The only established circuit at this time is through the heating coil 72, enclosed within the tube 22, and the liquid therefore becomes heated. This circuit extends from terminal $a$ through contact 74, heating coil 72, switch 60, contact 76, and to the other terminal $b$.

As the liquid becomes heated the fluid in the thermostat 64 expands and, when the temperature predetermined by the setting of the dial 62 is reached, the thermostatic fluid pressure is sufficient to and does snap the switch 60 to its open position. The heating circuit is thereby opened and a circuit is established through the motor. This circuit is as follows: terminal $a$, contact 74, heating coil 72, contact 78, motor 45, pivoted switch arm 80, contact 81, contact 76, and terminal $b$. The motor thereupon operates to move the parts in the direction of the arrow from the position illustrated in Fig. 3 to a position wherein the cam 50 engages the spring retracted pivoted arm 82 of the switch 52 and swings it clockwise a distance permitting the switch arm 80 to leave contact 81 and engage contact 83, a sliding pin 84 being employed between the free end of the arm 82 and the switch arm 80. Such movement opens the motor circuit and the parts thereupon stop with the cam holding this switch in the broken line position indicated in Fig. 7.

The cooking liquid is now at cooking temperature and the operator places the material to be cooked into the basket and lowers the basket into the liquid, the latch 40 being released by pressing the thumb against the releasing end 41. This immersion of the product quickly cools the liquid and causes contraction of the fluid in the thermostat which thereupon permits the switch 60 to return to closed position. The heating coil 72 and the motor circuit are both thereupon placed in live circuit and the parts operate in the direction of the arrow (Fig. 3) until the cam 50 leaves the arm 82 whereupon the arm returns to the position of Fig. 7 wherein the motor circuit is open and the parts stop in the position of Fig. 3.

The heating coil 72 continues to provide heat to the liquid which continues to cook the material during the time period necessary to raise the temperature of the liquid and its contents up to the temperature predetermined by the setting of the dial 62. When this temperature is reached the cooking of the material is completed and at such time the expansion of the thermostatic fluid snaps the switch 60 open. The above recited motor circuit through the contact 81 is thereupon re-established and the motor operates the parts from the position of Fig. 3 to said position wherein the cam 50 holds the pivoted arm 82 to the position indicated in broken lines in Fig. 7. During the first portion of this movement the crank 32 raises the support 34 and the basket to the position of Fig. 2 and the latch 40 holds them in this position, the basket being then above and out of the cooking liquid. The parts remain in this position with all circuits open until the cooking liquid is again cooled down to a point permitting the switch 60 to close.

It is now believed apparent that I have produced and herein disclosed a deep frying or cooking apparatus which is superior in every respect to like apparati heretofore known. The various parts are relatively simple and inexpensive to manufacture and assemble and the operation of the machine is entirely automatic except for the setting of the dial 62 to the proper temperature and the manual lowering of the basket into the cooking liquid. The handle 25 is always in position to be freely grasped and, as illustrated in Fig. 1, the basket is freely removable merely by grasping the handle and moving it rearwardly sufficiently to clear the finger 38. The latch release 41 is also conveniently located to be engaged by the thumb on the hand which holds the handle. The motor and its wiring are protected within the housing 14 which may be provided with a cover 85, the two housings 12 and 14 being spaced apart to provide an air gap therebetween protecting the operating parts from the heat of the cooking unit. It should also be particularly noted that the machine can be disassembled for cleaning purposes merely by lifting the basket from the container and then the heating unit therefrom, the circuit having disengageable connections at 58 and 59 for permitting free removal of the heating unit.

Having thus described and illustrated my invention, what I claim as new and desire to secure by Letters Patent of the United States is,

1. In a cooking machine, a container for a cooking liquid, a foraminous basket within the container, means for guiding the basket for straight up and down movement into and from the container, power driven means outside the container for effecting said upward movement of the basket from the container, and a latch for holding the basket in its raised position independently of the power driven means.

2. In a cooking machine, a container for cooking liquid, a foraminous basket within the container, means for guiding the basket for movement along a vertical path into and from the container, means rigid with the basket and extending outwardly of the container, means outside the container for receiving said rigid means and supporting the basket, power driven means operative on the third named means for raising the basket along said path from the container, and a latch for holding the basket in its raised position independently of the power means.

3. In a cooking machine, a container for a cooking liquid, a foraminous basket within the container, a handle rigid with the basket and extending laterally thereof and horizontally beyond the basket and container, a support mounted for vertical movement adjacent to but outside the container and having a horizontal handle receiving portion, means for releasably holding the handle horizontally in basket supporting position on said handle receiving portion, and power driven means for raising the support.

4. In a cooking machine, a container for a cooking liquid, a foraminous basket within the container, a vertical guideway adjacent to but outside the container, a support mounted for vertical movement in the guideway, means for releasably holding the basket on the support, power driven means for raising the support, and means including a releasable latch for holding the support in raised position independently of the power driven means.

5. In a cooking machine, a container for a cooking liquid, a foraminous basket within the container, a removable liquid-tight electric heating unit within the container between the basket and the bottom wall and one side wall of the container, means including an electric motor outside the container for raising the basket from the container, and means including thermostatic means supported on and carried by the heating element for automatically causing said raising of the basket when the cooking liquid in the container reaches a predetermined temperature.

6. The cooking machine defined in claim 5 plus an electric circuit for the heating unit and motor and including a switch normally closed to position closing the heating circuit and arranged in open position to establish the motor circuit, and means providing a support carrying the heating unit and switch, said support with the combined heating unit and thermostatic means and the switch providing an assembly removable from the machine as a unit.

7. In a cooking machine, a base, a container for a cooking liquid supported on the base, a foraminous basket within the container, a housing about the container, a second housing on the base adjacent to but spaced from the first housing, a support above the second housing, means on the support for removably holding the basket thereon with the basket in the container, and means including an electric motor and electrical connections within the second housing for raising the support and basket when the cooking liquid in the container reaches a predetermined temperature.

HARRY M. HUSK.